United States Patent [19]

Pagliuca

[11] 4,150,414

[45] Apr. 17, 1979

[54] AIR GAP SHORT CIRCUITING DEVICE FOR GAS TUBE ARRESTER

[75] Inventor: Peter J. Pagliuca, Patchogue, N.Y.

[73] Assignee: TII Corporation, Lindenhurst, N.Y.

[21] Appl. No.: 851,297

[22] Filed: Nov. 14, 1977

[51] Int. Cl.[2] .............................................. H02H 3/22

[52] U.S. Cl. ...................................... 361/124; 337/33; 337/34; 361/119

[58] Field of Search ............... 361/124, 117, 118, 119, 361/120; 337/15, 28, 32, 33, 34; 313/306, 325, 244, 246, 247

[56] References Cited

U.S. PATENT DOCUMENTS

| | | | |
|---|---|---|---|
| 2,454,448 | 11/1948 | Hasselhorn et al. | 361/117 |
| 2,522,700 | 9/1950 | Baker | 361/117 |
| 3,254,181 | 5/1966 | Lemieux | 361/124 X |
| 3,569,786 | 3/1971 | Kunugi | 361/120 X |
| 4,002,952 | 1/1977 | Menninga | 361/124 |
| 4,056,840 | 11/1977 | Lundsgaard et al. | 361/124 |

*Primary Examiner*—Patrick R. Salce
*Attorney, Agent, or Firm*—Morgan, Finnegan, Pine, Foley & Lee

[57] ABSTRACT

A short circuit clip with legs for resiliently engaging a line and ground electrode of a gas tube arrester includes an air gap device at one set of legs. The air gap device includes a conductor member extending from the clip to contact an arrester electrode and insulated from the clip by a layer of insulation having a hole to form the gap. The air gap device may be releasably connected with the clip or permanently attached. In the former case, a ferrule housing, which acts as an electrode for the air gap, is fitted to the clip. In the latter, the conductor is a rivet which attaches the device to the clip. Non-metallic fusible elements are interposed between the clip legs and associate arrester electrode.

10 Claims, 7 Drawing Figures

AIR GAP SHORT CIRCUITING DEVICE FOR GAS TUBE ARRESTER

BACKGROUND

Gas tube overvoltage protectors are widely used for the protection of equipment from overvoltage conditions which may be caused by lightning, high voltage line contact, and the like.

It is also a widely practiced technique to associate various fail-safe arrangements with such tubes and with other types of protectors, e.g., air gap arresters, to meet various contingencies. For example, the presence of a sustained overload, as where a power line has come in continued contact with a protected telephone line, produces a concomitant sustained ionization of the gas tube and the resultant passage of heavy currents through the tube. Such currents will in many cases destroy the overvoltage protector and may also constitute a fire hazard.

One common approach to this problem is to employ fusible elements which fuse in the presence of such overloads and provide either a permanent short circuiting of the arrester directly, or function to release another mechanism, e.g. a spring loaded shorting bar, which provides the short circuit connection (commonly, the arrester electrodes are both shorted and grounded). The presence of the permanent short and ground condition serves to flag attention to that condition thus signalling the need for its inspection or replacement. Examples of this type of fail-safe protection are found in U.S. Pat. Nos. 3,254,179; 3,281,625; 3,340,431; 3,396,343; and 3,522,570. Several of these patents also incorporate with the fail-safe feature, a backup air gap arrangement so that there is both fail-safe fusible (short) type protection as well as backup air gap protection.

Still another approach, disclosed in commonly assigned application Ser. No. 719,077 filed Aug. 31, 1976, is based on the discoveries that an effective fail-safe function can be achieved by employing a non-metallic fusible material and that important advantages are consequently realized. The fusible material is an electrical insulator which in the exemplary emobodiments is interposed between one or more of the electrodes and the shorting mechanism. Surprisingly, the response of the nonmetallic material to thermal conditions is precise and, moreover, does not leave an insulative film in the course of fusing which might otherwise interfere with the short circuit contact.

The need exists, nonetheless, to develop fail-safe arrangements which provide both surge and failure protection for gas tube arresters.

SUMMARY

The present invention is directed to fail-safe surge arrester assembly in which both back-up surge and air gap back-up protection is provided in a short circuit clip.

Accordingly, the present invention may be summarized as follows: A total fail-safe spring clip assembly for use with a gas filled surge arrester having two electrodes defining an ionization gap which comprises: short circuit clamp means having electrode engaging portions adapted and arranged to resiliently engage the electrodes of said gas arrester to establish a short circuit connection therebetween; non-metallic fusible means on one of said electrode engaging portions and arranged to be in thermal contact with said ionization gap to prevent short circuit connection except in the presence of sustained overload causing said fusible means to fuse and yield to permit establishment of said short circuit connection; and air gap means operatively connected to said clamp means and including a conductor member having one portion arranged to contact one of said arrester electrodes; insulator means having a hole therein interposed between said conductor and said clamp means, whereby an air gap is formed between said conductor and said clip.

DETAILED DESCRIPTION

Figure 1:
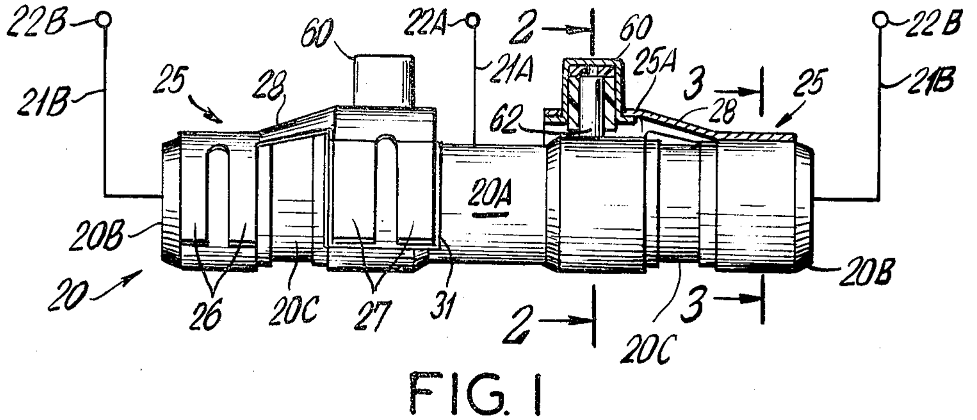
FIG. 1 is an elevation view, partly schematic and partly in cross-section, of a gas filled arrester with a shorting clip having an air gap device of the present invention.

While this invention is susceptible of embodiment in many different forms, there is shown in the drawings and will hereinafter be described in detail a preferred embodiment of the invention and alternatives thereto, with the understanding that the present disclosure is to be considered as an exemplification of the principles of the invention and is not intended to limit the invention to the embodiments illustrated.

In the embodiment illustrated in FIGS. 1–4, a gas tube 20 is provided, the tube including a center body 20A and electrode end caps 20B each separated from the center body 20A by a respective insulated sleeve section 20C.

The arrester 20, which is of known construction and may comprise for example TII Model 31, has its end electrodes (not shown) extending inwardly from the end caps 20B toward the center of the tube interior to define a gap between the electrodes. Spacing and dimensions are such that each electrode also forms a gap with the center body conductive casing section 20A.

The tube is filled with a gas and the electrode end caps 20B are each provided as by welding with a lead 21B and terminal 22B, e.g., a spade lug, for connection to the circuit to be protected. Center body 20A is likewise provided with a lead 21A welded thereto and the associated connection 22A for connection to ground.

In the presence of overvoltage conditions the gas in tube 20 ionizes thereby creating in known manner, conductive shunting paths between each line of the protected circuit and ground (via the respective terminal lead 21B and ground lead 21A).

A short circuiting means 25, illustrated as a clip, is disposed between each line electrode 20B and the ground electrode 20A. Clip 25 is illustrative, since it will be understood by those skilled in the art that other clip arrangements are readily adaptable to this function, when modified in accordance with the present invention.

Figure 2:
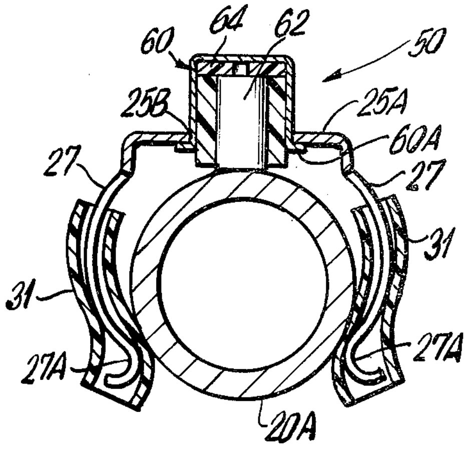
FIG. 2 is an enlarged cross-sectional view taken along line 2—2 in FIG. 1 illustrating the air gap device.
Figure 3:
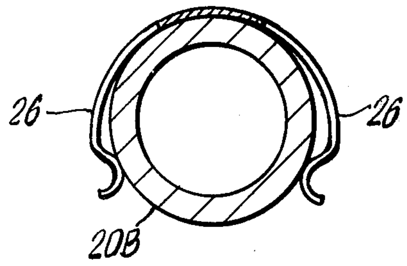
FIG. 3 is an enlarged cross-sectional view taken along line 3—3 in FIG. 1.

Each clip 25, which is illustratively of grain oriented tin plated carbon steel, heat treated for stress relief from hydrogen embrittlement after plating, includes a first set of spring fingers 26 resiliently engaging, respectively, end cap (line electrode) 20B and another set of spring fingers 27 disposed about center body (ground electrode) 20A. The spring fingers 26 and 27 are integrally connected by the bridge section 28 of each clip. The spring fingers 26, as best illustrated in FIG. 3, are in direct contact with the end caps 20B to provide electrical contact therewith. Conversely, as shown in greater detail in FIG. 2, the fingers 27 of the short-circuit clips are spaced from contact with center body 20A by reason of fusible sleeves 31, described in greater detail below. Specifically, each of the fingers 27 includes a contact portion 27A which is urged in the direction of contact with grounded center body 20A and which consequently presses resiliently on the fusible member interposed therebetween.

In FIGS. 1, 2, 5 and 7, tubular sleeves 31 are arranged about the fingers 27 of clips 25 so that a layer of fusible material is interposed between contact sections 27A and center body 20A.

Fusible sleeves 31 are of non-metallic, electrically insulative composition. Suitable materials will have melt temperatures in the range corresponding to thermal conditions at arrester thermal overload and will have suitable dielectric strength, dielectric constant, dissipation factor and volume and surface resistivity to provide the requisite insulative function. The preferred material should also be free of embrittlement due to heat aging, be non-flammable under the overload conditions, have good mechanical properties and be inert to corrosives and weather.

Exemplary of such a class of materials are certain of the fluoroplastics, such as fluorinated ethylene propylene polymer (FEP), the polymer perfluoroalkoxy (PFA), the modified copolymer of ethylene and tetrafluoroethylene (ETFE) (marketed under the DuPont Company trademark Tefzel), and poly (ethylene-chlorotrifluoro-ethylene) (E-CTFE copolymer) marketed under the Allied Chemical Corporation mark Halfar. (The fluoroplastic polytetrafluoroethylene [TFE], on the other hand, does not have suitable melt properties for the illustrated application.) In the examples, sleeves 31 are formed of 0.38LG FEP tubing, AWG 6.

Figure 4:
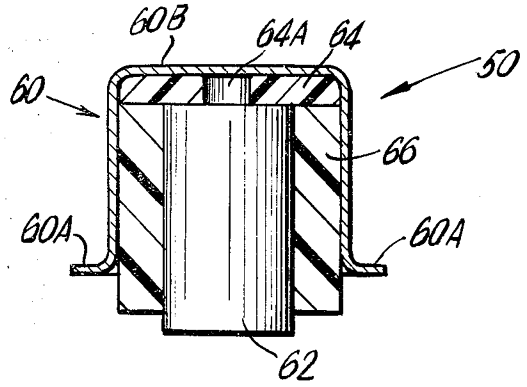
FIG. 4 is an enlarged sectional view further illustrating the air gap device of FIG. 2.

Each of the short circuit clips 25 is provided with an air gap device which may be operated as a unit with the clip. The first air gap device 50 is illustrated in FIGS. 1, 2 and 4.

In this embodiment the top portion 25A of the clip 25 overlying center body 20A is flat and contains a hole 25B. Inserted in hole 25B is a generally cylindrical shaped, close ended eyelet 60. Eyelet 60 includes a lateral, annular flange 60A which abuts against the bottom surface of top portion 25A to act as a stop and reference the position of the eyelet, as well as providing electrical contact with the clip 25. In this manner, eyelet 60 is in electrical contact with end cap 20B.

The top 60B of the eyelet forms one electrode of the air gap. The other electrode is provided by a cylindrical shaped conductor 62, e.g. copper pellet. Conductor 62 is positioned concentrically within eyelet 60 and insulated from the top 60B by a disc 64 of insulation material. Conductor 62 is positioned within an insulating sleeve 66. The upper end of conductor 62 is exposed to the top 60B of the eyelet through an aperture 64A in disc 64. The thickness of disc 64 forms the air gap in the device. Advantageously, the air gap distance is about 3 mils to provide a strike voltage in the range of 500–1000 volts. Disc 64 and sleeve 66 are shown as two separate elements, but it will be appreciated that they may be formed as a single element.

The lower end of conductor 62 extends below the eyelet flange 60A and is held in contact with center body 20A by the clip 25. Insulating sleeve 66 should also extend below flange 60A a sufficient distance to assure that an air gap is not formed between conductor 62 and flange 60A.

During normal operation of the arrester 20, transient surges produce ionization in the normal manner to protect the subject equipment. If, however, a sustained surge condition occurs as where a line is permanently contacted by a higher voltage line, the resultant ionization currents flowing through the arrester produce excessive heat; the sleeves 31, placed in the arrester region to respond to this heating, thereby fuse. As this occurs, spring fingers 27, and in particular the contact sections 27A thereof, move into contact with center body 20A as the fusible layer 31 yields and flows. When electric contact is made, a short circuit is established between the respective end cap and the center body thus providing a fail-safe (short) action.

Additionally, the air gap 64A in device 50 provides back-up protection in the event of gas tube failure. With this additional provision a failure of the gas tube in the open mode, as for example by reason of a gas leak, does not result in a loss of protection; the air gap provides back-up protection prior to arrester replacement.

Figure 6:
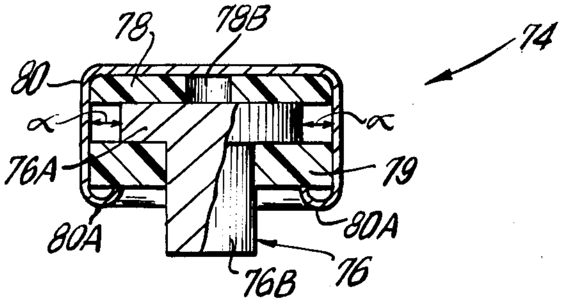
FIG. 6 is an enlarged, partial cross-sectional view of the air gap device of FIG. 5.
Figure 5:
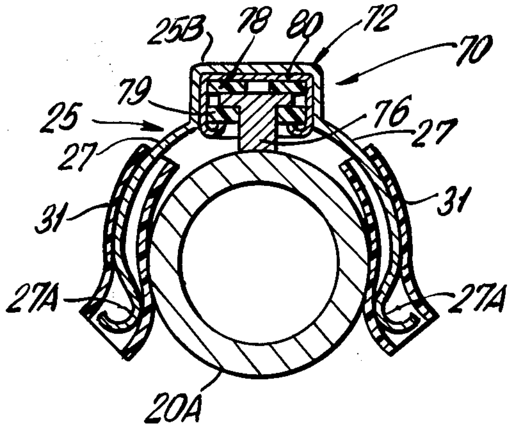
FIG. 5 is a cross-sectional view similar to FIG. 2 and illustrating a second alternative air gap device in a short circuit clip.

An alternative air gap device 70 is illustrated in FIGS. 5 and 6, wherein similar numerical designations indicate elements corresponding to those elements previously described. In this embodiment, the top portion 25B of clip 25 is formed with a downwardly opening, generally cylindrical shape receiver 72 which receives the air gap module 74, FIG. 6.

Module 74 includes a stepped, cylindrical conductor 76 having an enlarged upper portion 76A and reduced lower portion 76B. An insulating disc 78 is positioned on the top of portion 76A. Disc 78 includes an aperture 78B which forms the air gap. A ring shaped insulator 79 is positioned concentrically about portion 76B and abuts against the lower surface of portion 76A.

Conductor 76, and insulating member 78 and 79 are positioned in a closed end eyelet in ferrule 80 whose open end edges 80A are crimped or rolled into engagement with the lower surface of insulator 79 to complete the module. During fabrication, care must be taken to assure that the radial distance $\alpha$ between conductor portion 76A and the sidewall of eyelet 80 is greater than the thickness of insulator 78 (the air gap) to assure that a secondary air gap is not formed.

As illustrated in FIG. 5, module 74 is inserted into portion 72 of clip 25 with the conductor directed downwardly into engagement with center body 20A.

Figure 7:
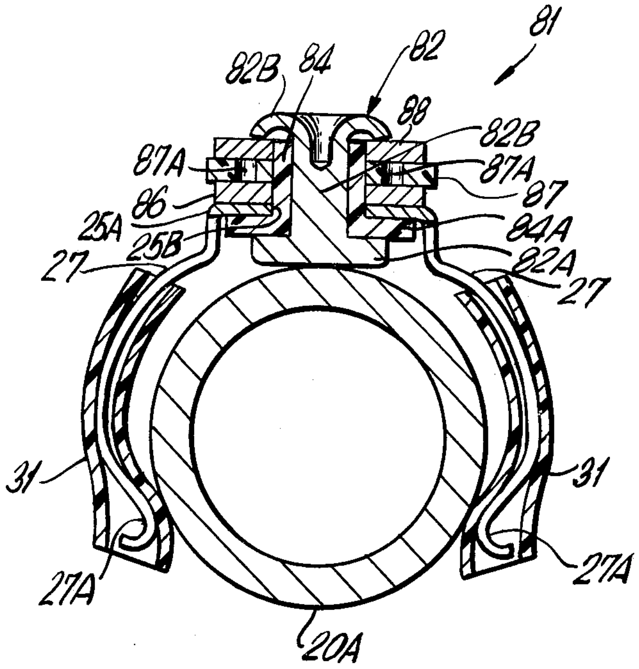
FIG. 7 is a cross-sectional view, similar to FIG. 2, illustrating a third alternative air gap device in a short circuit clip.

Turning now to FIG. 7, a third air gap device 81 positioned in a spring clip 25 of the type previously described. The top 25A of the clip over center body 20A has a hole 25B in which the air gap device is retained. The air gap device includes a metallic conductive rivet 82 having an enlarged diameter portion 82A in contact with center body 20A and a reduced diameter portion 82B extending upwardly. A stepped insulator collar 84 is positioned concentrically about reduced diameter portion 82B with an annular flange portion 84A extending radially outwardly and interposed between the bottom surface of the top 25A and the top surface of conductor portion 82A.

A first metallic washer 86 is located in abutting relationship with the top surface of top 25A. This washer 86 is optional and may be eliminated if the top 25A is large enough to function as an electrode for the air gap. Immediately above washer 25A is an insulating washer 87 which contains at least one air gap 87A (two are illustrated). The thickness of washer 87 determines the air gap. The other electrode of the air gap is provided by a washer 88 positioned directly above washer 87.

Washers 86, 87 and 88 are concentric with insulator 84 and rivet 82 and are held in position by bending or spinning over the top end 82B of rivet 82 into gripping engagement with the top surface of washer 88.

These modifications and others may be made by those skilled in the art without departing from the scope and spirit of the present invention as pointed out in the appended claims.

What is claimed is:

1. A total fail safe spring clip assembly for use with a gas filled surge arrester having two electrodes defining an ionization gap which comprises:

short circuit clamp means having electrode engaging portions adapted and arranged to resiliently engage the electrodes of said gas arrester to establish a short circuit connection therebetween; non-metallic fusible means on one of said electrode engaging portions and arranged to be in thermal contact with said ionization gap to prevent short circuit connection except in the presence of sustained overload causing said fusible means to fuse and yield to permit establishment of said short circuit connection;

and air gap means operatively connected to said clamp means and including a conductor member having one portion arranged to contact one of said arrester electrodes; insulator means having a hole therein interposed between said conductor and said clamp means, whereby an air gap is formed between said conductor and said clip.

2. The assembly of claim 1 wherein said air gap means includes a ferrule having a closed end and an open end, said ferrule being in electrical contact with said clamp means; said conductor member being positioned in said ferrule and extending outwardly through said open end; said insulating means being interposed between said conductor and the closed end of said ferrule such that the air gap is between the conductor and closed end of the ferrule.

3. The assembly of claim 2, wherein said conductor member is generally cylindrical in shape.

4. The assembly of claim 2, wherein said ferrule is in direct contact with said clamp means.

5. The assembly of claim 2, wherein said ferrule is positioned within a cylindrical portion in said clamp means.

6. The assembly of claim 5, wherein said conductor has a stepped cylindrical shape with an enlarged diameter portion abutting said insulation means, and said insulation further includes an insulating washer located at the opposite surface of said enlarged portion, said open end of the ferrule being bent over in engagement with said washer.

7. An assembly of claim 2, wherein said insulation means include a disc shaped element having said air gap aperture therein, said element being positioned between said conductor and the closed end of said ferrule.

8. An assembly of claim 7, wherein said conductor is generally cylindrical in shape and said insulation means further includes a sleeve element circumscribing said cylindrical conductor.

9. An assembly of claim 7, wherein said conductor has a stepped cylindrical shape with an enlarged diameter portion abutting said disc insulator; said insulation means further including an insulating washer located at the opposite surface of said enlarged diameter portion, said open end of said ferrule being in abutting relationship with said insulating washer.

10. The assembly of claim 1, wherein said air gap means includes a rivet conductor extending through said clamp means and second means insulating said rivet conductor from said clamp means; a conductive washer concentric with said rivet conductor and in electrical contact therewith; said air gap defining insulator means being interposed between said conductive washer and said clamp means.

* * * * *